United States Patent
Heo et al.

(10) Patent No.: US 11,658,313 B2
(45) Date of Patent: May 23, 2023

(54) SEPARATOR ASSEMBLY FOR FUEL CELL AND FUEL CELL STACK INCLUDING SAME

(71) Applicants: Hyundai Motor Company, Seoul (KR); Kia Motors Corporation, Seoul (KR)

(72) Inventors: Seong Il Heo, Gyeonggi-Do (KR); Yoo Chang Yang, Gyeonggi-do (KR); Byeong-Heon Jeong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 533 days.

(21) Appl. No.: 16/373,980

(22) Filed: Apr. 3, 2019

(65) Prior Publication Data

US 2020/0185730 A1    Jun. 11, 2020

(30) Foreign Application Priority Data

Dec. 6, 2018  (KR) .......................... 10-2018-0156386

(51) Int. Cl.
*H01M 8/0247*  (2016.01)
*H01M 8/0276*  (2016.01)

(52) U.S. Cl.
CPC ....... *H01M 8/0247* (2013.01); *H01M 8/0276* (2013.01)

(58) Field of Classification Search
CPC .......................... H01M 8/0247; H01M 8/0276
See application file for complete search history.

(56) References Cited

U.S. PATENT DOCUMENTS

| 2008/0280177 | A1* | 11/2008 | Ose | H01M 8/2483 |
| | | | | 96/4 |
| 2009/0239128 | A1 | 9/2009 | Keyser et al. | |
| 2012/0164560 | A1* | 6/2012 | Keyser | H01M 8/241 |
| | | | | 429/516 |
| 2014/0011110 | A1* | 1/2014 | Oku | H01M 8/0276 |
| | | | | 429/456 |
| 2017/0358805 | A1* | 12/2017 | Yoon | H01M 8/0286 |
| 2019/0088956 | A1* | 3/2019 | Glueck | H01M 8/0271 |
| 2019/0097248 | A1* | 3/2019 | Xi | H01M 8/0276 |

(Continued)

FOREIGN PATENT DOCUMENTS

| JP | 1996-009489 | | 3/1996 |
| JP | 2004063295 | A | 2/2004 |
| JP | 2009-104987 | A | 5/2009 |

(Continued)

*Primary Examiner* — Nathanael T Zemui
(74) *Attorney, Agent, or Firm* — Fox Rothschild LLP

(57) ABSTRACT

A separator assembly for a fuel cell includes: a first separator having a protruding bead seal providing a seal; a second separator joined to the first separator to be integrated therewith and having an arched bulge protruding in the same direction as the bead seal at a location corresponding to a location where the bead seal is formed; a gasket provided on a concave surface of the bulge of the second separator at the location where the bulge is formed, the concave surface being opposite to a convex surface of the bulge; and a sealing agent applied to a convex surface of the bead seal of the first separator at the location where the bead seal is formed.

4 Claims, 10 Drawing Sheets

(56) References Cited

U.S. PATENT DOCUMENTS

2020/0153000 A1* 5/2020 Stohr .................. H01M 8/0271

FOREIGN PATENT DOCUMENTS

| JP | 2010-272474 A | 12/2010 |
| JP | 2017162795 A | 9/2017 |
| JP | 2018-125258 A | 8/2018 |
| JP | 2018-137074 A | 8/2018 |
| JP | 2018-527716 A | 9/2018 |

* cited by examiner

SEPARATOR ASSEMBLY FOR FUEL CELL AND FUEL CELL STACK INCLUDING SAME

CROSS REFERENCE TO RELATED APPLICATION

The present application claims under 35 U.S.C. § 119(a) the benefit of Korean Patent Application No. 10-2018-0156386, filed Dec. 6, 2018, the entire contents of which are incorporated by reference herein.

BACKGROUND

(a) Technical Field

The present disclosure relates to a separator assembly for a fuel cell and a fuel cell stack including the same, more particularly, to the fuel cell stack configured to provide improved airtightness and durability while reducing production costs.

(b) Description of the Related Art

As is well known in the art, a fuel cell is a type of power generator that converts chemical energy of fuel into electric energy through an electrochemical reaction in a stack. Fuel cells have a wide range of applications, including serving as industrial power generators, serving as household power generators, powering vehicles, and powering small electronic devices such as portable devices. In recent years, fuel cells have increasingly been used as high efficiency clean energy sources.

FIG. 1 (RELATED ART) is a view showing a configuration of a typical fuel cell stack, FIG. 2 (RELATED ART) is a view showing a unit cell for a fuel cell to which a sub-gasket is applied, and FIG. 3 (RELATED ART) is a view showing an arrangement of gaskets in the unit cell for the fuel cell to which the sub-gasket is applied.

As shown in FIG. 1, a typical fuel cell stack has a membrane electrode assembly (MEA) 10 located at the innermost portion thereof. The MEA 10 includes a polymer electrolyte membrane (PEM) 11 allowing transport of positively charged ions (protons) therethrough, and catalyst layers (CLs), that is, an anode 12 and a cathode 13, applied on opposite surfaces of the PEM 11 to cause hydrogen and oxygen to react.

Further, gas diffusion layers (GDLs) 20 are laminated outside of the MEA 10 where the anode 12 and the cathode 13 are located, and separators 30a and 30b each having a flow field for supplying fuel and discharging water generated by reactions in the MEA 10 are respectively located outside of the GDLs 20 with gaskets 40 interposed therebetween. End plates 50 are assembled to the outermost portion of the MEA 10 to structurally support and secure individual components described above in position.

Thus, at the anode 12 of the fuel cell stack, an oxidation reaction in which hydrogen is oxidized takes places to generate hydrogen ions (protons) and electrons, and the generated protons and electrons flow to the cathode 13 through the PEM 11 and a wire, respectively. At the cathode 13, water is generated through an electrochemical reaction involving the protons and the electrons that have flowed from the anode 12, and oxygen contained in air, and this flow of electrons generates electricity.

Meanwhile, the separators 30a and 30b are generally manufactured such that lands serving as supports and channels serving as flow paths of a fluid are alternately repeated. In other words, a typical separator has a structure in which lands and channels (flow paths) are alternately repeated in a serpentine configuration. Because of this, a channel on one side of the separator, which faces the GDL 20, is utilized as a space through which reactant gases such as hydrogen or air flows, while a channel of the other side is utilized as a space through which a coolant flows. Accordingly, a single unit cell can be comprised of a pair of separators, namely one separator with a hydrogen/coolant channel and the other separator with an air/coolant channel.

Meanwhile, as shown in FIG. 2, the MEA 10 includes sub-gaskets 14 surrounding peripheral portions of the anode 12 and the cathode 13 to facilitate handling of the PEM 11, the anode 12, and the cathode 13 while improving airtightness of the stack.

Further, multiple inlet and outlet multiple outlet manifolds are provided at opposite sides of the sub-gasket 14 and opposite sides of the separators 30a and 30b, respectively.

Meanwhile, as shown in FIG. 3, because the reactant gases and the coolant have to flow between the sub-gasket 14 and the pair of separators 30a and 30b, injection molded rubber gaskets 40a, 40b, and 40c having a predetermined thickness are arranged between the sub-gasket 14 and the pair of separators 30a and 30b. Accordingly, when unit cells are stacked on top of each other, the gaskets are compressed, thus ensuring airtightness of the stack while maintaining intervals therebetween.

However, the rubber gaskets 40a, 40b, and 40c are costly to manufacture. For this reason, a separator having a bead seal has been proposed. The bead seal integrally protrudes from the surface of the separators at a height equal to the thickness of the gaskets 40a, 40b, and 40c arranged between the separators, and a sealing agent is applied in a thin layer to the separators, thus securing airtightness of the stack.

However, in the case of forming a fuel cell stack by stacking multiple unit cells on top of each other and then compressing them, the shape of the bead seals is changed due to a surface pressure acting on portions where the bead seals are formed, leading to degradation in airtightness of the stack.

The foregoing is intended merely to aid in the understanding of the background of the present disclosure, and is not intended to mean that the present disclosure falls within the purview of the related art that is already known to those skilled in the art.

SUMMARY

Accordingly, the present disclosure provides a fuel cell and a fuel cell stack including the same, wherein the fuel cell stack is configured to provide improved airtightness and durability while reducing production costs.

According to one aspect of the present disclosure, there is provided a separator assembly for a fuel cell, the separator assembly including: a first separator having a protruding bead seal providing a seal; a second separator joined to the first separator to be integrated therewith and having an arched bulge protruding in the same direction as the bead seal at a location corresponding to a location where the bead seal is formed; a gasket provided on a concave surface of the bulge of the second separator at the location where the bulge is formed, the concave surface being opposite to a convex surface of the bulge; and a sealing agent applied to a convex surface of the bead seal of the first separator at the location where the bead seal is formed.

The bulge formed at the second separator may be lower in protruding height than the bead seal formed at the first separator.

A height of the bulge formed at the second separator may be equal to or less than the sum of thicknesses of the first separator and the second separator.

The gasket may be larger in width than the sealing agent.

The gasket may be formed by injecting an elastic rubber material, and the sealing agent may be applied by screen coating.

According to another aspect of the present disclosure, there is provided a fuel cell stack formed by stacking multiple unit cells, the fuel cell stack including: the multiple unit cells each comprised of a membrane electrode assembly having a sub-gasket provided on each side thereof, a pair of gas diffusion layers, an anode separator, and a cathode separator, wherein the anode separator and the cathode separator constituting adjacent cells are arranged to face each other and joined together to be integrated with each other, the anode separator may have a protruding bead seal providing a seal, and the cathode separator may have an arched bulge protruding in the same direction as the bead seal at a location corresponding to a location where the bead seal is formed.

A gasket may be provided on a concave surface of the bulge of the cathode separator at the location where the bulge is formed, the concave surface being opposite to a convex surface of the bulge, and a sealing agent may be applied to a convex surface of the bead seal of the anode separator at the location where the bead seal is formed.

The bead seal formed at the anode separator may protrude toward the sub-gasket abutting the bead seal and may be sealed by the sealing agent in tight contact with the sub-gasket; in a region where hydrogen flows, the anode separator and the cathode separator may be joined together by junctions at locations on opposite sides of the bead seal; and the bead seal may have a pair of through holes through which the opposite sides of the bead seal communicate with each other and allowing hydrogen to flow between the anode separator and the sub-gasket.

The bulge formed at the cathode separator may protrude in a direction opposite to the sub-gasket abutting the bulge and may be sealed by the gasket in tight contact with the sub-gasket; in a region where air flows, the cathode separator and the anode separator may be spaced apart from each other at a location outside the bulge around an upstream side of an air flow path with respect to a direction in which air flows, while the cathode separator and the anode separator may be joined together by a junction at a location outside the bulge around a downstream side of the air flow path with respect to the direction in which air flows; and the cathode separator may be holed at the location outside the bulge around the downstream side of the air flow path with respect to the direction in which air flows, thus forming a through hole passing through first and second surfaces of the cathode separator and allowing air that flows between the cathode separator and the anode separator to flow between the cathode separator and the sub-gasket.

The bulge formed at the cathode separator may protrude in a direction opposite to the sub-gasket abutting the bulge and may be sealed by the gasket in tight contact with the sub-gasket, and in a region where air flows, the gasket may have a step such that opposite sides of the gasket communicate with each other by the step, thus allowing air to flow between the cathode separator and the sub-gasket.

The anode separator may be sealed by the sealing agent in tight contact with the sub-gasket, while the cathode separator may be sealed by the gasket in tight contact with the sub-gasket, and in a region where a coolant flows, the anode separator and the cathode separator may be spaced apart from each other at locations on opposite sides of the bead seal that is formed in the region where the coolant flows between the anode separator and the cathode separator, thus allowing the coolant to flow between the anode separator and the cathode separator.

According to the present disclosure, when a pair of separators are joined together to be integrated with each other, the bead seal is applied to one separator while the arched bulge and the rubber gasket are applied to the other separator, whereby it is possible for the stack to be improved in airtightness and durability while reducing production cost.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION OF THE DISCLOSURE

Figure 1:
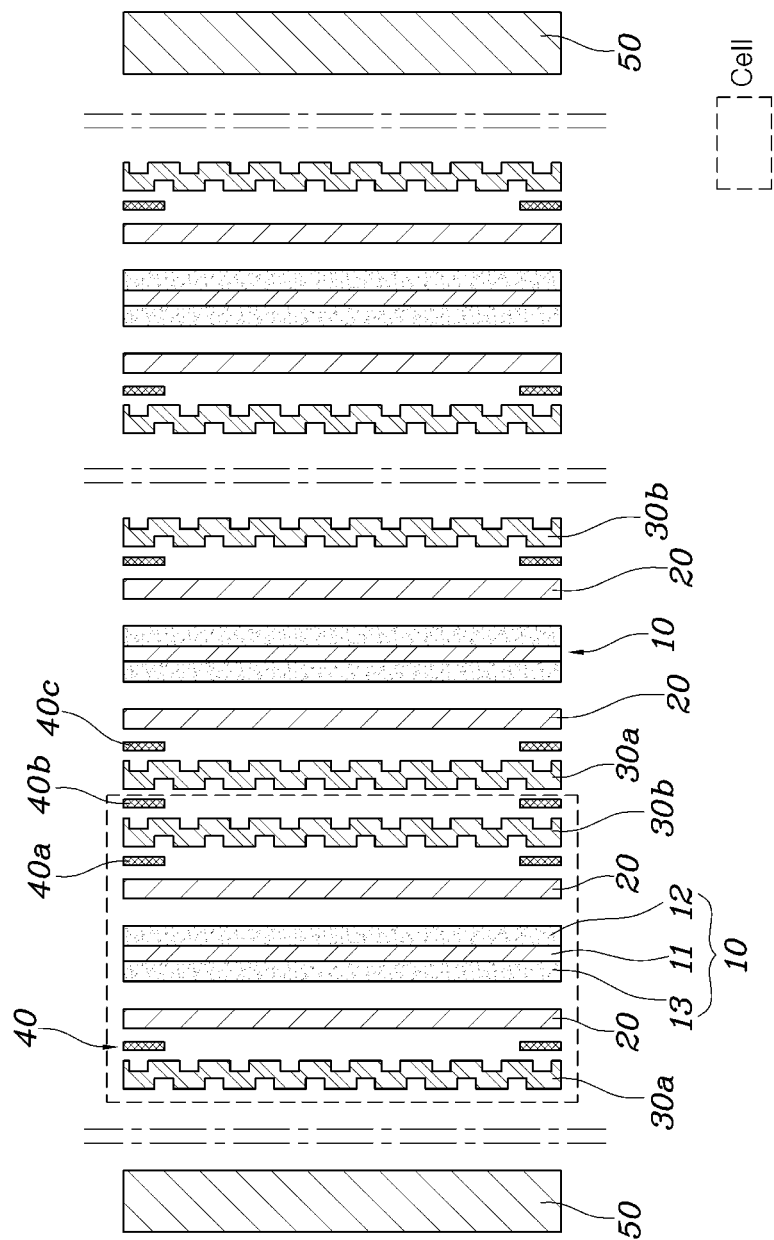
FIG. 1 (RELATED ART) is a view showing a configuration of a typical fuel cell stack.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, exemplary embodiments of the present disclosure will be described in detail with reference to the accompanying drawings. The exemplary embodiments of the present disclosure are presented to make complete disclosure of the present disclosure and help those who are ordinarily skilled in the art best understand the disclosure. Various changes to the following embodiments are possible and the scope of the present disclosure is not limited to the following embodiments. Throughout the drawings, the same reference numerals will refer to the same or like parts.

Figure 2:
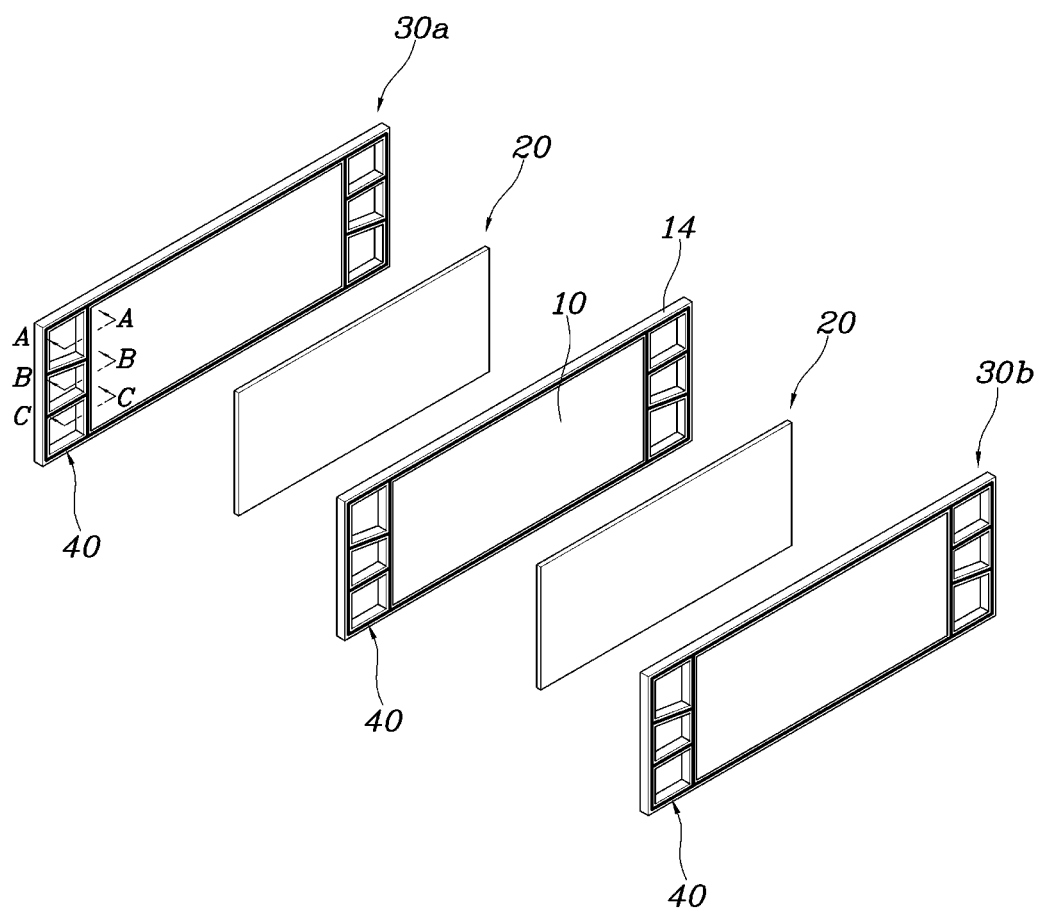
FIG. 2 (RELATED ART) is a view showing a unit cell for a fuel cell to which a sub-gasket is applied.
Figure 3:
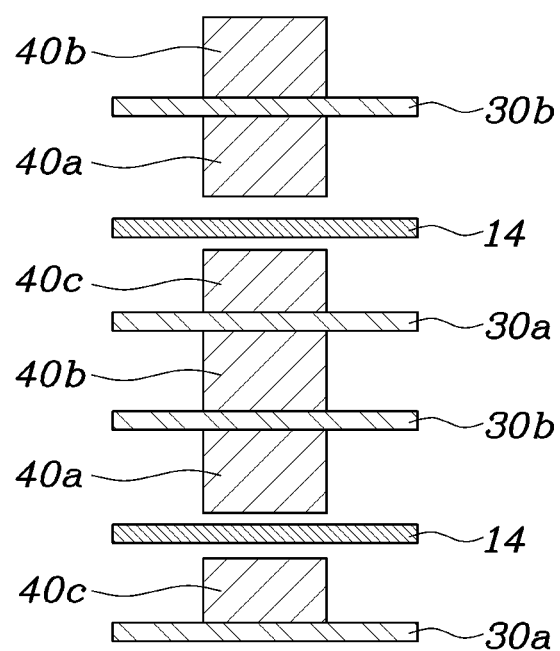
FIG. 3 (RELATED ART) is a view showing an arrangement of gaskets in the unit cell for the fuel cell to which the sub-gasket is applied.

A fuel cell stack according to an embodiment of the present disclosure is proposed to improve a shape and an airtight structure of a separator while maintaining a stack structure according to the related art shown in FIGS. 1 and 2, thus improving airtightness while securing fluidity of reactant gases and a coolant. Thus, as shown in FIGS. 1 and 2, the fuel cell stack according to the embodiment of the present disclosure is comprised of multiple unit cells stacked on top of each other in series. Each of the unit cells has a membrane electrode assembly (MEA) 10 having a sub-gasket 14 provided on each side thereof, a pair of gas diffusion layers (GDLs) 20, and anode and cathode separators 30a and 30b. Accordingly, an anode separator 30a constituting one cell and a cathode separator 30b constituting an adjacent cell are arranged to face each other. In the present embodiment, the anode separator 30a and the cathode separator 30b facing each other are joined together to be integrated with each other, thus forming a separator assembly.

Figure 4:
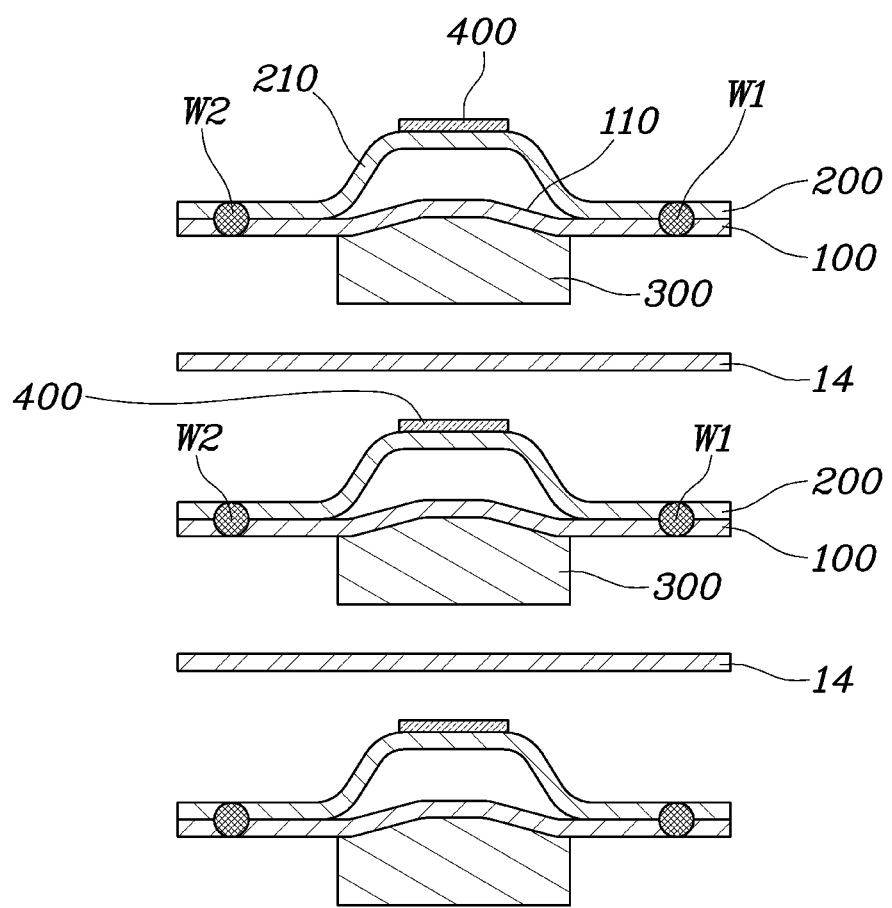
FIGS. 4 and 5 are views showing a main part of a separator assembly for a fuel cell according to an embodiment of the present disclosure.
Figure 5:
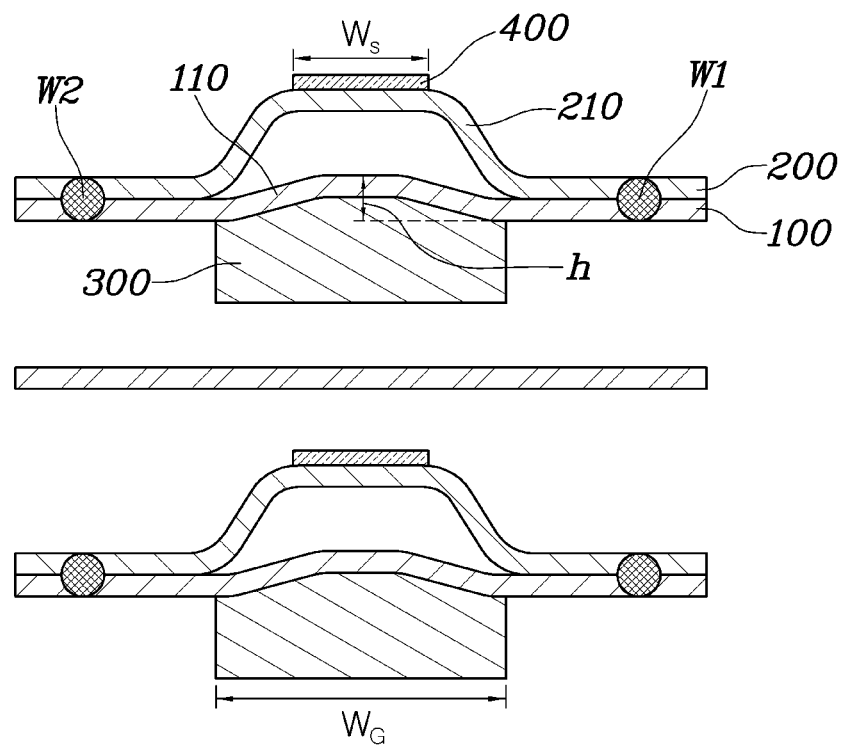

FIGS. 4 and 5 are views showing a main part of the separator assembly for the fuel cell according to the embodiment of the present disclosure. For example, FIGS. 4 and 5 show the shape and the airtight structure of the separator, which are improved in the present embodiment. Herein, for convenience of explanation, the sub-gasket 14, an anode separator 200, and a cathode separator 100 are shown in a state of being spaced apart from each other.

As shown in FIG. 5, the separator assembly for the fuel cell according to the present embodiment is proposed to minimize deformation of the separators due to a surface pressure while maintaining airtightness in a case where separator assemblies are stacked on top of each other and compressed, and preferably includes: a first separator 200 having a protruding bead seal 210 providing a seal; a second separator 100 joined to the first separator 200 to be integrated therewith and having an arched bulge 110 protruding in the same direction as the bead seal 210 at a location corresponding to a location where the bead seal 210 is formed; a gasket 300 provided on a concave surface of the bulge 110 of the second separator 100 at the location where the bulge 110 is formed, the concave surface being opposite to a convex surface of the bulge 110; and a sealing agent 400 applied to a convex surface of the bead seal 210 of the first separator 200 at the location where the bead seal 210 is formed. Hereinafter, the first separator 200 will be described as the anode separator, and the second separator 100 will be described as the cathode separator.

Further, it is preferable that the gasket 300 is formed by injecting an elastic rubber material, and the sealing agent 400 is applied by screen coating.

The bulge 110 corresponding to the bead seal 210 provided at the anode separator 200 is provided at the cathode separator 100 as described above. This is to prevent a case in which when stacking the fuel cell stack, if a surface pressure acts on a portion where the bead seal 210 is formed, the cathode separator 10 is deformed into a space defined by the bead seal 210 between the cathode separator 100 and the anode separator 200, causing a reduction in contact force between the cathode separator 100 and the anode separator 200 and airtightness of the stack.

To this end, in the present embodiment, the arched bulge 110 is pre-formed at the cathode separator 100 such that even if the surface pressure is generated on the portion where the bead seal 210 is formed, an arched structure prevents the portion from undergoing deformation.

Accordingly, it is preferable that the bulge 110 formed at the cathode separator 100 is lower in protruding height than the bead seal 210 formed at the anode separator 200. It is more preferable that a height h of the bulge 110 is equal to or less than the sum of thicknesses of the anode separator 200 and the cathode separator 100. Further, it is preferable that a width $W_G$ of the gasket 300 is larger than a width $W_S$ of the sealing agent 400 in order to disperse the surface pressure. It is more preferable that the width $W_G$ of the gasket 300 is larger than the sum of the width $W_S$ of the sealing agent 400 and a stacking tolerance. If the width $W_S$ of the sealing agent 400 is larger than the width $W_G$ of the gasket 300, the width of the bead seal 210 is increased accordingly. In this case, the bead seal 210 is weak in rigidity. Thus, when stacking the fuel cell stack, the bead seal 210 may undergo deformation, leading to degradation in airtightness.

Meanwhile, it is preferable that the airtight structure proposed above is applied to a region surrounding the MEA constituting the fuel cell stack and regions surrounding multiple inlet manifolds and multiple outlet manifolds, thus securing airtightness of such regions.

However, a flow path for flowing of reactant gases such as hydrogen and air and the coolant has to be secured between a reaction surface on which the MEA is located, the inlet manifolds, and the outlet manifolds.

Thus, the separator assembly according to the present disclosure can change the structure of any one of the bead seal, the bulge, and the gasket such that a flow path is formed in each region where hydrogen, air, or the coolant flows.

Figure 6:
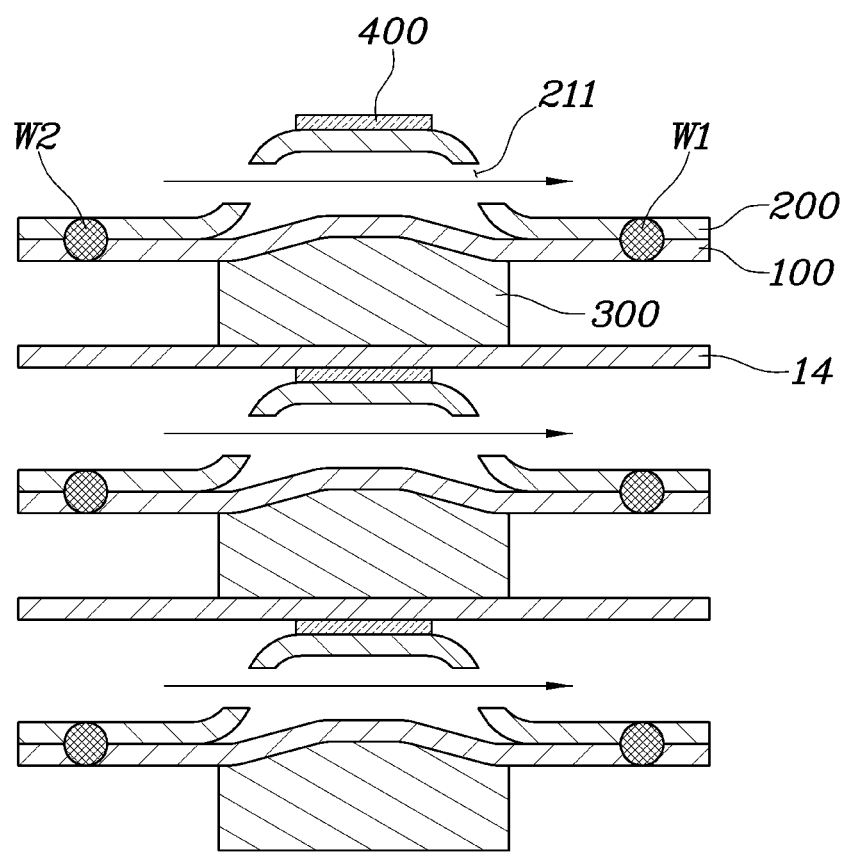
FIG. 6 is a view showing a region where hydrogen flows in the separator assembly for the fuel cell according to the embodiment of the present disclosure.
Figure 7:
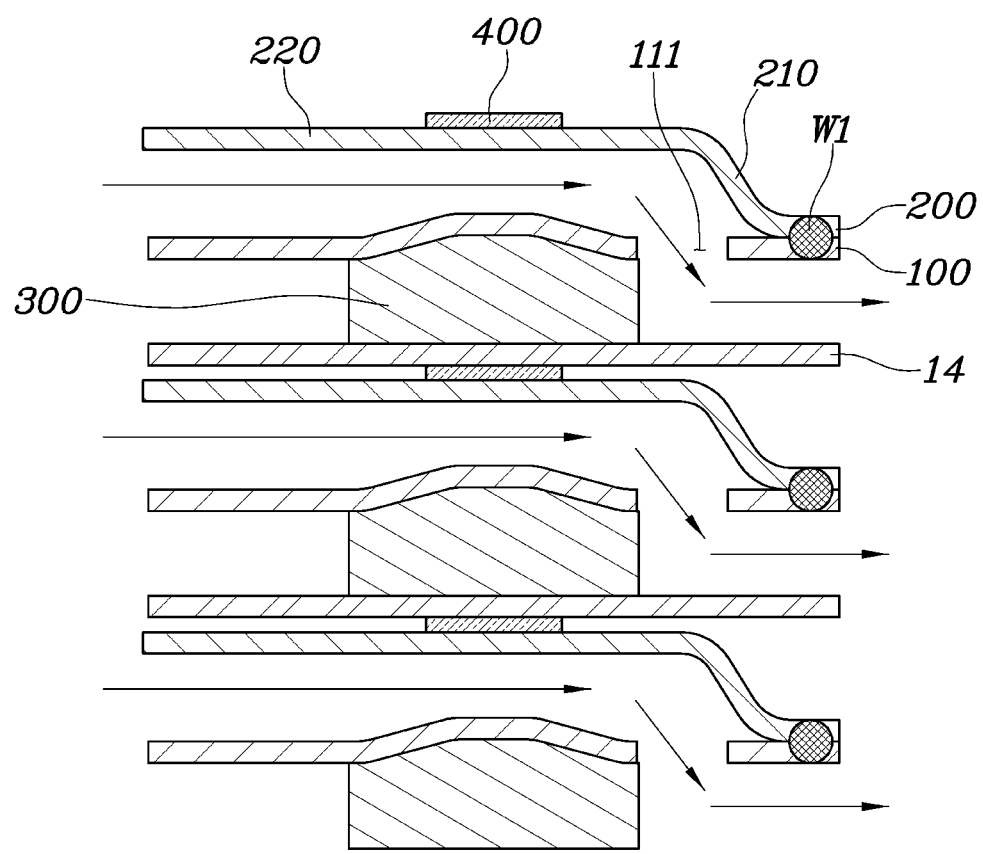
FIGS. 7 and 8 are views showing a region where air flows in the separator assembly for the fuel cell according to the embodiment of the present disclosure.
Figure 8:
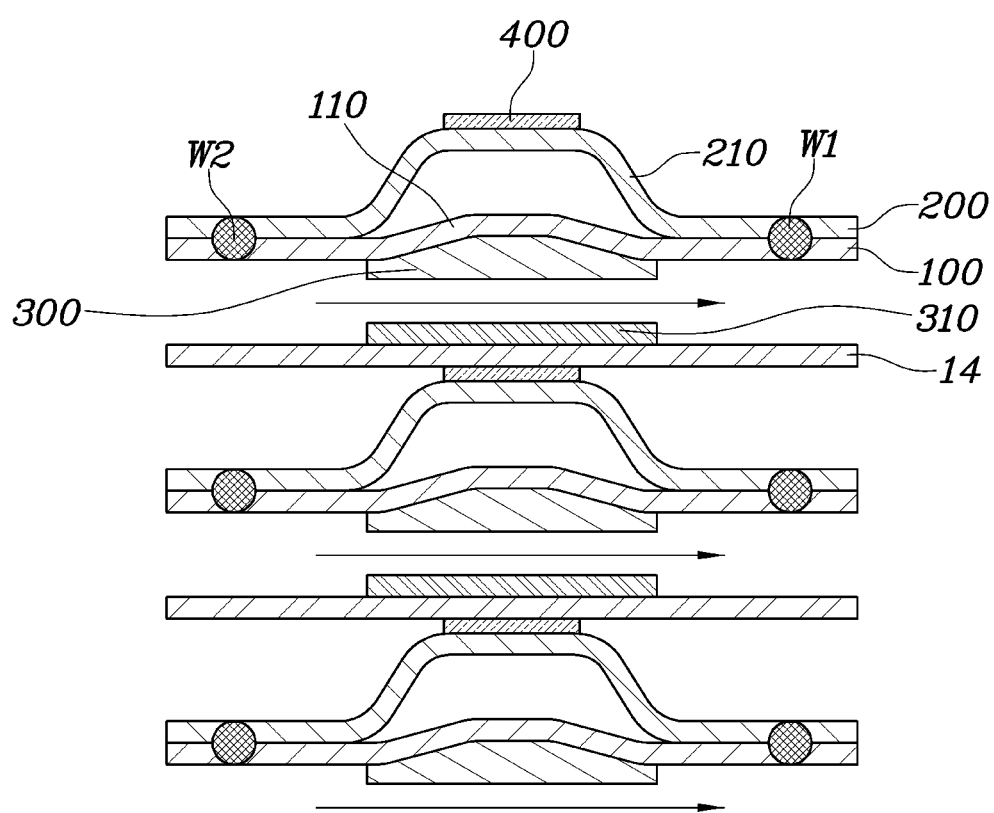
Figure 9:
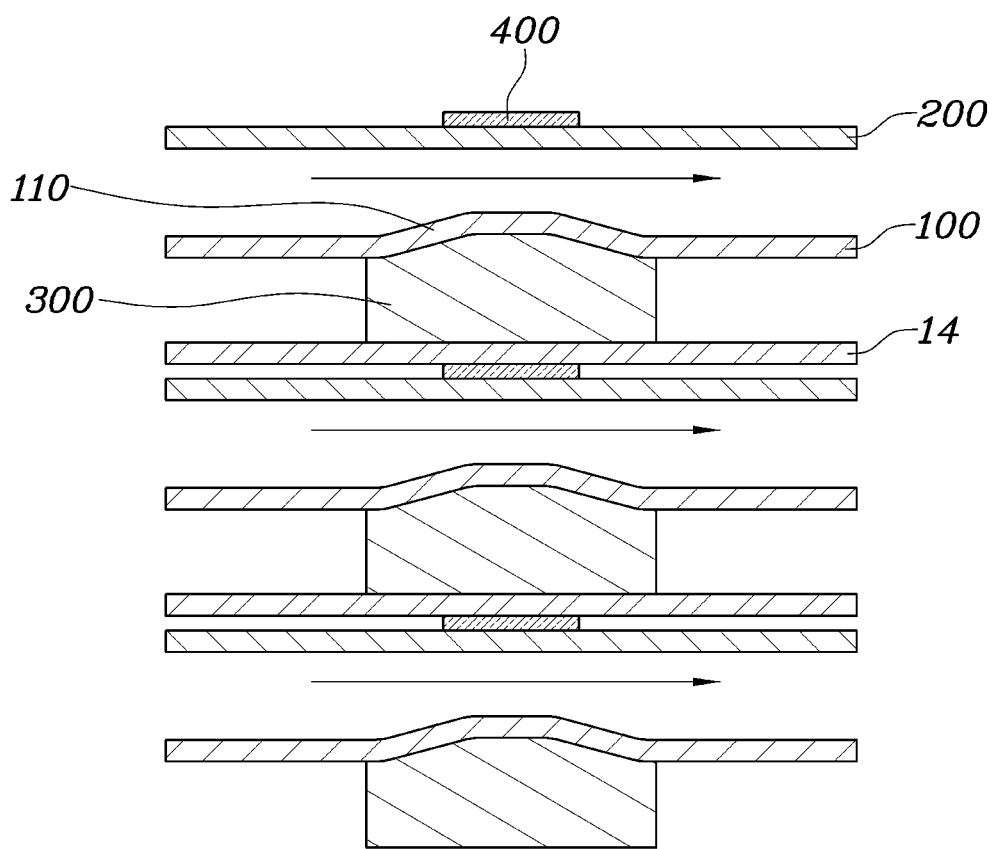
FIG. 9 is a view showing a region where a coolant flows in the separator assembly for the fuel cell according to the embodiment of the present disclosure.

FIG. 6 is a view showing a region where hydrogen flows in the separator assembly for the fuel cell according to the embodiment of the present disclosure, FIGS. 7 and 8 are views showing a region where air flows in the separator assembly for the fuel cell according to the embodiment of the present disclosure; FIG. 9 is a view showing a region where a coolant flows in the separator assembly for the fuel cell according to the embodiment of the present disclosure. For example, FIG. 6 corresponds to a sectional structure taken along line A-A of FIG. 2, FIGS. 7 and 8 correspond to a sectional structure taken along line C-C of FIG. 2, and FIG. 9 corresponds to a sectional structure taken along line B-B of FIG. 2.

First, in the region where hydrogen flows as shown in FIG. 6, the bead seal 210 formed at the anode separator 200 protrudes toward the sub-gasket 14 abutting the bead seal and is sealed by the sealing agent 400 in tight contact with the sub-gasket 14. Herein, the anode separator 200 and the cathode separator 100 are joined together by junctions W1 and W2 at locations on opposite sides of the bead seal 210.

Further, the bead seal 210 has a pair of communication holes 211 through which the opposite sides of the bead seal 210 communicate with each other. Thus, hydrogen flows between the anode separator 200 and the sub-gasket 14 through the pair of communication holes 211 whereby hydrogen is supplied to the reaction surface.

Further, in the region where air flows as shown in FIG. 7, the bulge 110 formed at the cathode separator 100 protrudes in a direction opposite to the sub-gasket 14 abutting the bulge and is sealed by the gasket 300 in tight contact with the sub-gasket 14. Herein, the cathode separator 100 and the anode separator 200 are spaced apart from each other at a location outside the bulge 110 around the upstream side of an air flow path with respect to a direction in which air flows, while the cathode separator 100 and the anode separator 200 are joined together by the junction W1 at a location outside the bulge 110 around the downstream side of the air flow path with respect to the direction in which air flows.

Further, the cathode separator 100 is holed at the location outside the bulge 110 around the downstream side of the air flow path with respect to the direction in which air flows, thus forming a through hole 111 passing through first and second surfaces of the cathode separator and allowing air that flows between the cathode separator 100 and the anode separator 200 to flow between the cathode separator 100 and the sub-gasket 14. Thus, air flows between the cathode separator 100 and the anode separator 200 and then passes through the through hole 111 at the location outside the bulge 110 around the upstream side of the air flow path with respect to the direction in which air flows. Thereafter, air flows between the cathode separator 100 and the sub-gasket 14 at the location outside the bulge 110 around the downstream side of the air flow path with respect to the direction in which air flows, whereby air is supplied to the reaction surface.

Meanwhile, FIG. 8 shows another embodiment of air flow in the region where air flows. The bulge 110 formed at the cathode separator 100 protrudes in the direction opposite to the sub-gasket 14 abutting the bulge and is sealed by the gasket 300 in tight contact with the sub-gasket 14. Further, the anode separator 200 and the cathode separator 100 are joined together by the junctions W1 and W2 at locations on the opposite sides of the bead seal 210.

Herein, the gasket 300 provided between the cathode separator 100 and the sub-gasket 14 has a step 310 such that opposite sides of the gasket 300 communicate with each other by the step 310. Thus, air is allowed to flow between the cathode separator 100 and the sub-gasket 14, whereby air is supplied to the reaction surface.

Meanwhile, in the region where the coolant flows as shown in FIG. 9, the anode separator 200 is sealed by the sealing agent 400 in tight contact with the sub-gasket 14, while the cathode separator 100 is sealed by the gasket 300 in tight contact with the sub-gasket 14.

Herein, the anode separator 200 and the cathode separator 100 are spaced apart from each other at locations on the opposite sides of the bead seal 210 that is formed in the region where the coolant flows. Thus, the coolant is allowed to flow between the anode separator 200 and the cathode separator 100.

Figure 10:
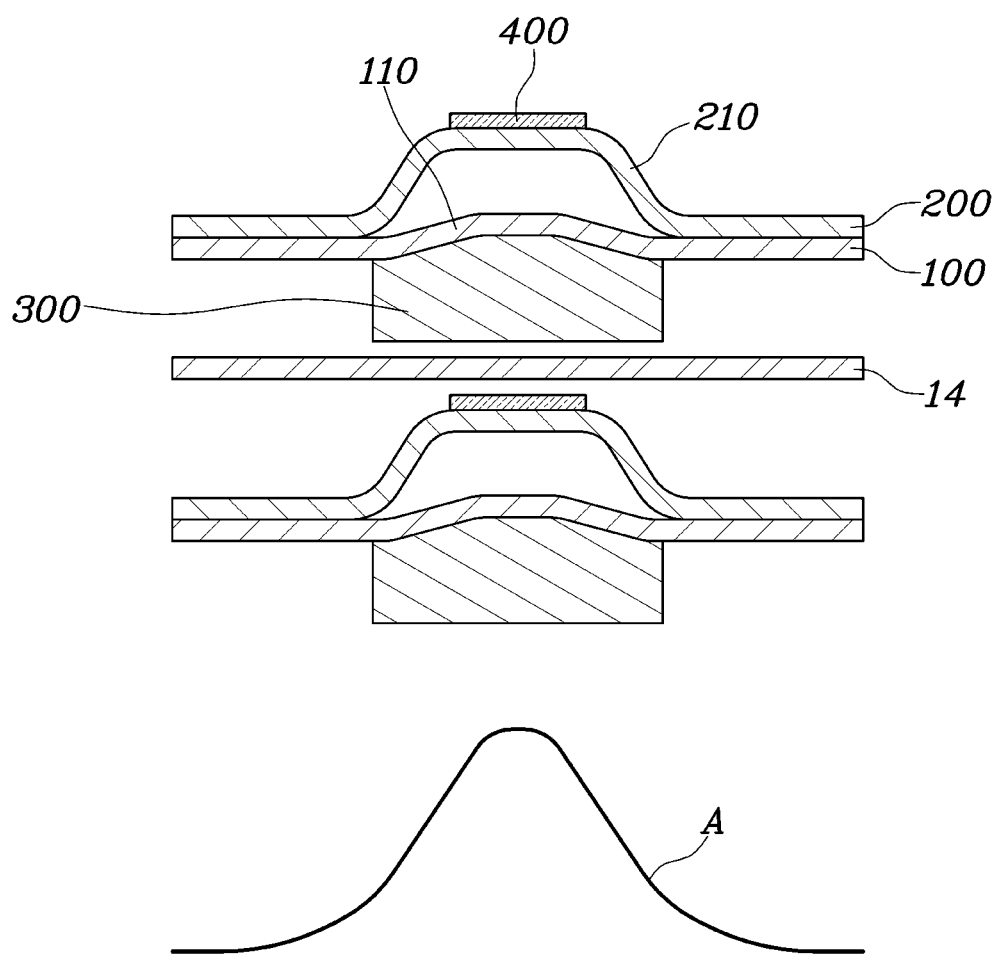
FIG. 10 is a view showing a surface pressure acting on the separator assembly for the fuel cell according to the embodiment of the present disclosure.

Meanwhile, FIG. 10 is a view showing the surface pressure acting on the separator assembly for the fuel cell according to the embodiment of the present disclosure. When stacking the fuel cell stack by employing the separator assembly according to the present disclosure, it was found that surface pressure distribution A shows a tendency in surface pressure to increase toward the center of the bead seal 210 depending on the shape of the bead seal 210. Hence, to prevent the cathode separator 100 from being deformed due to the surface pressure formed as described above, the arched bulge 110 formed at the cathode separator 100 is employed.

Although the exemplary embodiments of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A fuel cell stack formed by stacking multiple unit cells, the fuel cell stack comprising:
   the multiple unit cells each comprised of a membrane electrode assembly having a sub-gasket provided on each side thereof, a pair of gas diffusion layers, an anode separator, and a cathode separator,
   wherein the anode separator and the cathode separator constituting adjacent cells are arranged to face each other and joined together to be integrated with each other,
   the anode separator has a protruding bead seal providing a seal, and
   the cathode separator has an arched bulge protruding in the same direction as the bead seal at a location corresponding to a location where the bead seal is formed, wherein an upper surface of a central side of the arched bulge is located above both end surfaces of the cathode separator;
   wherein a gasket is provided on a concave surface of the bulge of the cathode separator at the location where the bulge is formed, the concave surface being opposite to a convex surface of the bulge;
   a sealing agent is applied to a convex surface of the bead seal of the anode separator at the location where the bead seal is formed, wherein the bulge formed at the cathode separator protrudes in a direction opposite to the sub-gasket abutting the bulge and is sealed by the gasket in tight contact with the sub-gasket;
   in a region where air flows, the cathode separator and the anode separator are spaced apart from each other at a location outside the bulge around an upstream side of an air flow path with respect to a direction in which air flows, while the cathode separator and the anode separator are joined together by a junction at a location outside the bulge around a downstream side of the air flow path with respect to the direction in which air flows; and the cathode separator is holed at the location outside the bulge around the downstream side of the air flow path with respect to the direction in which air flows, thus forming a through hole passing through first and second surfaces of the cathode separator and allowing air that flows between the cathode separator and the anode separator to flow between the cathode separator and the sub-gasket; and wherein the through hole is configured to pass through a portion of the cathode separator directly facing the sub-gasket.

2. The fuel cell stack of claim 1, wherein the bead seal formed at the anode separator protrudes toward the sub-gasket abutting the bead seal and is sealed by the sealing agent in tight contact with the sub-gasket;

in a region where hydrogen flows, the anode separator and the cathode separator are joined together by junctions at locations on opposite sides of the bead seal; and the bead seal has a pair of through holes through which the opposite sides of the bead seal communicate with each other and allowing hydrogen to flow between the anode separator and the sub-gasket.

3. The fuel cell stack of claim 1, wherein the bulge formed at the cathode separator protrudes in a direction opposite to the sub-gasket abutting the bulge and is sealed by the gasket in tight contact with the sub-gasket, and in a region where air flows, the gasket has a step such that opposite sides of the gasket communicate with each other by the step, thus allowing air to flow between the cathode separator and the sub-gasket.

4. The fuel cell stack of claim 1, wherein the anode separator is sealed by the sealing agent in tight contact with the sub-gasket, while the cathode separator is sealed by the gasket in tight contact with the sub-gasket, and in a region where a coolant flows, the anode separator and the cathode separator are spaced apart from each other at locations on opposite sides of the bead seal that is formed in the region where the coolant flows between the anode separator and the cathode separator, thus allowing the coolant to flow between the anode separator and the cathode separator.

* * * * *